United States Patent
Bucher

[15] 3,645,634
[45] Feb. 29, 1972

[54] APPARATUS FOR MEASURING LIGHT TRANSMISSION OF A SEMITRANSPARENT MEMBRANE

[72] Inventor: Jean Bertolet Bucher, Lancaster, Pa.
[73] Assignee: RCA Corporation
[22] Filed: May 14, 1970
[21] Appl. No.: 37,215

[52] U.S. Cl. .......................356/201, 356/206, 250/219 FR, 250/239
[51] Int. Cl. .................................................G01n 21/30
[58] Field of Search ...............250/210, 219 F, 237, 239; 356/158, 159, 168, 201, 206

[56] References Cited

UNITED STATES PATENTS

| | | | |
|---|---|---|---|
| 2,978,591 | 4/1961 | Ringger | 250/239 |
| 2,442,690 | 6/1948 | Hoffman et al. | 250/239 X |
| 2,856,542 | 10/1958 | McPheeters | 250/239 |

Primary Examiner—Archie R. Borchelt
Assistant Examiner—C. E. Church
Attorney—Glenn H. Bruestle

[57] ABSTRACT

An apparatus, including a light-beam-producing means, a means for splitting the bean into a measuring beam and a reference beam, a reference photocell in the path of the reference beam, a measuring photocell having a substantially flat window in the path of said measuring beam for producing a measured signal, a means for holding the semitransparent membrane in the path of the measuring beam, and means for comparing the reference signal with the measured signal for producing an output signal. The window is mounted at an angle with respect to the path of the measuring beam to deflect any reflected light away from the path of the measuring beam. A shutter may be positioned in the path of the measuring beam. In one form of the apparatus, the light source, beam splitter and reference photocell are enclosed in a dust-tight enclosure having an exit window for transmitting the measuring beam. A means for producing a turbulent flow of clean gas in front of the exit window may be provided.

8 Claims, 4 Drawing Figures

INVENTOR.
Jean B. Bucher.

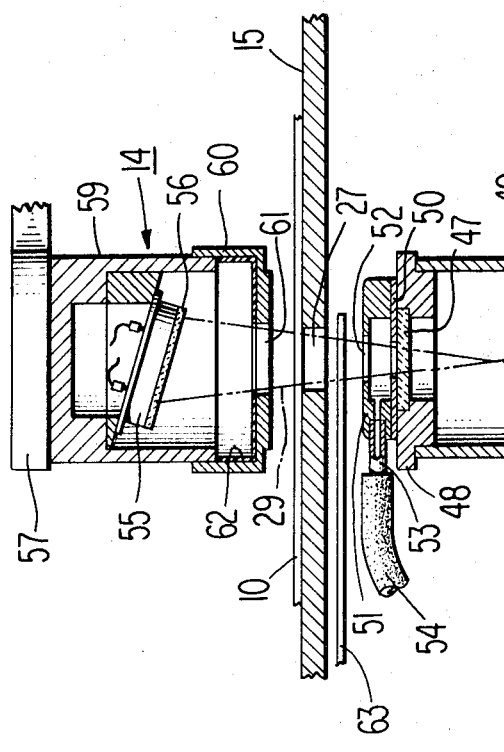
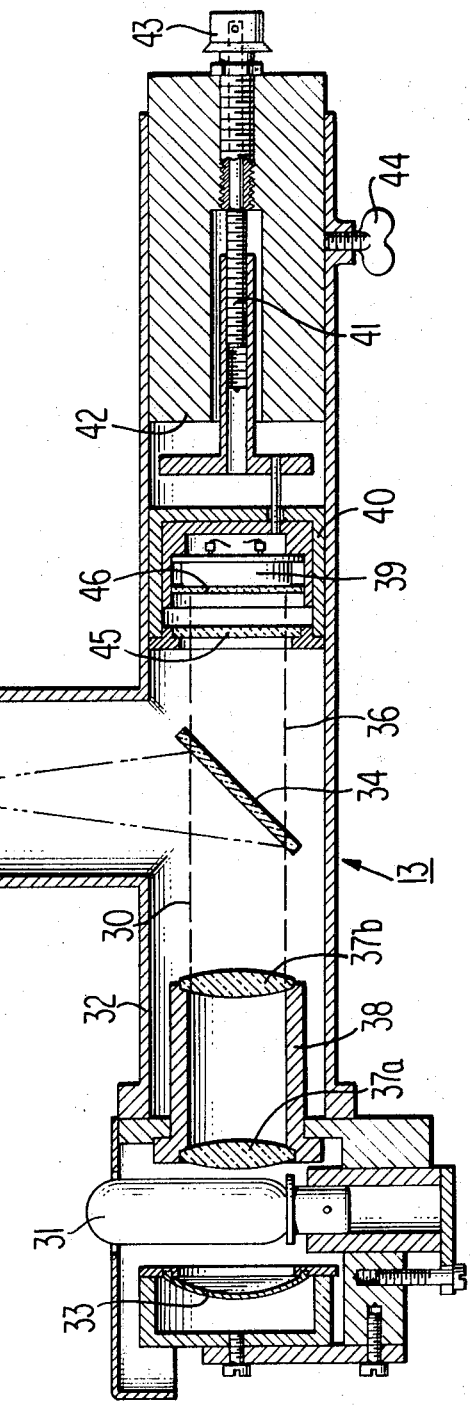

APPARATUS FOR MEASURING LIGHT TRANSMISSION OF A SEMITRANSPARENT MEMBRANE

BACKGROUND OF THE INVENTION

This invention relates to an improved apparatus for measuring light transmission of a semitransparent membrane, and particularly, but not exclusively, to a novel apparatus for measuring the light transmission of an aperture mask for a color television picture tube.

One prior art apparatus for measuring light transmission of a semitransparent membrane includes a light source for producing a light beam, a beam splitter for dividing the beam into a measuring beam and a reference beam, a measuring photocell positioned in the path of the measuring beam to provide a measured signal, and a reference photocell positioned in the path of the reference beam to produce a reference signal, means for holding the membrane in the path of the measuring beam between the beam splitter and the measuring photocell, and a means for comparing the reference signal and the measured signal to produce an output signal. The reference photocell includes a flat window positioned normal to the path of the measuring beam.

Ideally, the prior apparatus should provide an accurate measurement of the light transmission of the semitransparent membrane. In practice, a portion of the measuring beam is reflected back from the window in the path of the measuring beam and is further re-reflected back from the membrane to be additively combined with the actual light transmitted through the membrane, resulting in an inaccurate measurement of light transmission. Differences in reflectivity of the same membrane or different membranes result in different values of reflectivity further increasing the range of inaccuracy of the apparatus.

In one form of the prior apparatus, the light source, the beam splitter, and the reference photocell are enclosed in a dust-free enclosure having an exit window for transmitting the measuring beam. Dirt or dust collected on the window scatters the transmitted light thereby reducing the intensity of the measuring beam. This results in further unreliability in the accuracy of measurements of light transmission of the membrane as related to the intensity variation of the measuring beam.

Measuring photocells of the type used in the prior apparatus have a substantial recovery time from brightness and darkness. The recovery time is especially long after the photocell has been exposed to direct light from the measuring beam such as occurs when the membrane is not present, or improperly positioned in the apparatus. The exposure to direct light may result in inaccurate light transmission measurement of a subsequent membrane, since the measuring photocell may not have recovered fully from the direct light exposure.

SUMMARY OF THE INVENTION

The novel apparatus includes a means for producing a light beam, a means for splitting the light beam into a measuring beam and a reference beam, a measuring photocell having a substantially flat window, a reference photocell, and a means for holding a semitransparent membrane as in the prior art.

Unlike the prior art, the window of the measuring photocell is mounted at an angle with respect to the path of the measuring beam to deflect any reflection of the measuring beam by the window away from the path of the measuring beam. Mounting the window at an angle prevents the addition of reflected light that is re-reflected from the membrane to the transmitted light through the membrane, resulting in a substantially improved accuracy of measurement of membrane light transmission.

In one form, the novel apparatus includes a shutter positioned in the path of the measuring beam between the beam-splitting means and the membrane-holding means. The shutter prevents the full intensity of the measuring beam from striking the measuring photocell. The shutter eliminates the need for substantial recovery time from brightness necessary to stabilize the measuring photocell, resulting in an improved accuracy of the measurement of membrane light transmission.

In another form, the novel apparatus includes a dusttight enclosure containing the means for producing the light beam, a means for splitting the light beam, and the reference photocell; and having an exit window for transmitting the measuring beam. A means for producing a turbulent flow of clean gas in front of the exterior surface of the exit window is provided. By producing a turbulent gas flow over the front surface of the window, the surface is maintained substantially free of particles such as dust or dirt which would interfere with the intensity of the measuring beam, resulting in improved accuracy for light-transmission measurements for the same membrane and for different membranes.

BRIEF DESCRIPTION OF THE DRAWING

FIG. 3 is an enlarged sectional front elevational view of a portion of the apparatus of FIG. 2, including the improvements of the invention.

FIG. 4 is a schematic diagram of a portion of the apparatus of FIGS. 1 and 2 illustrating the measuring photocell window mounted at an angle.

DESCRIPTION OF THE PREFERRED EMBODIMENT

Figure 1:
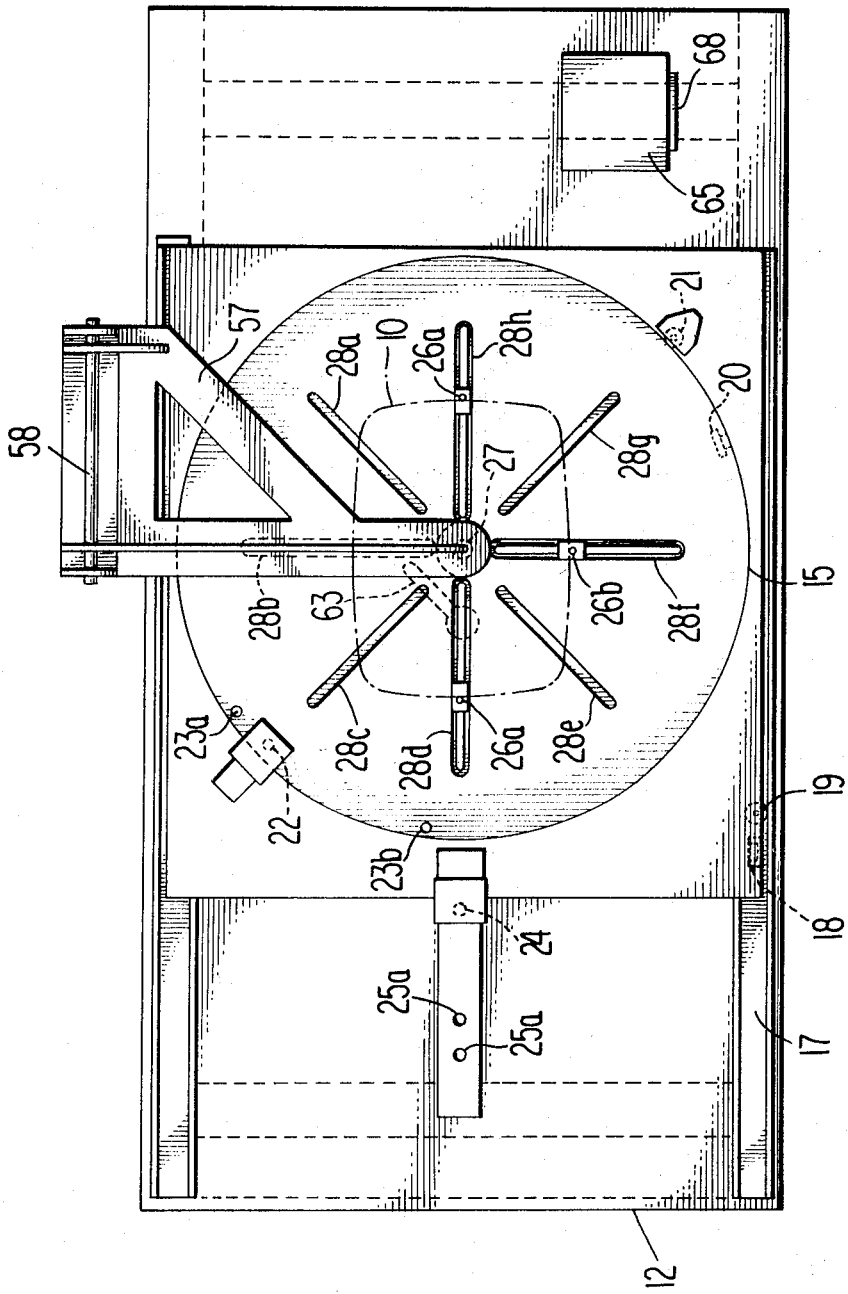
FIG. 1 is a plan view of a novel apparatus for measuring the light transmission of a membrane.
Figure 2:
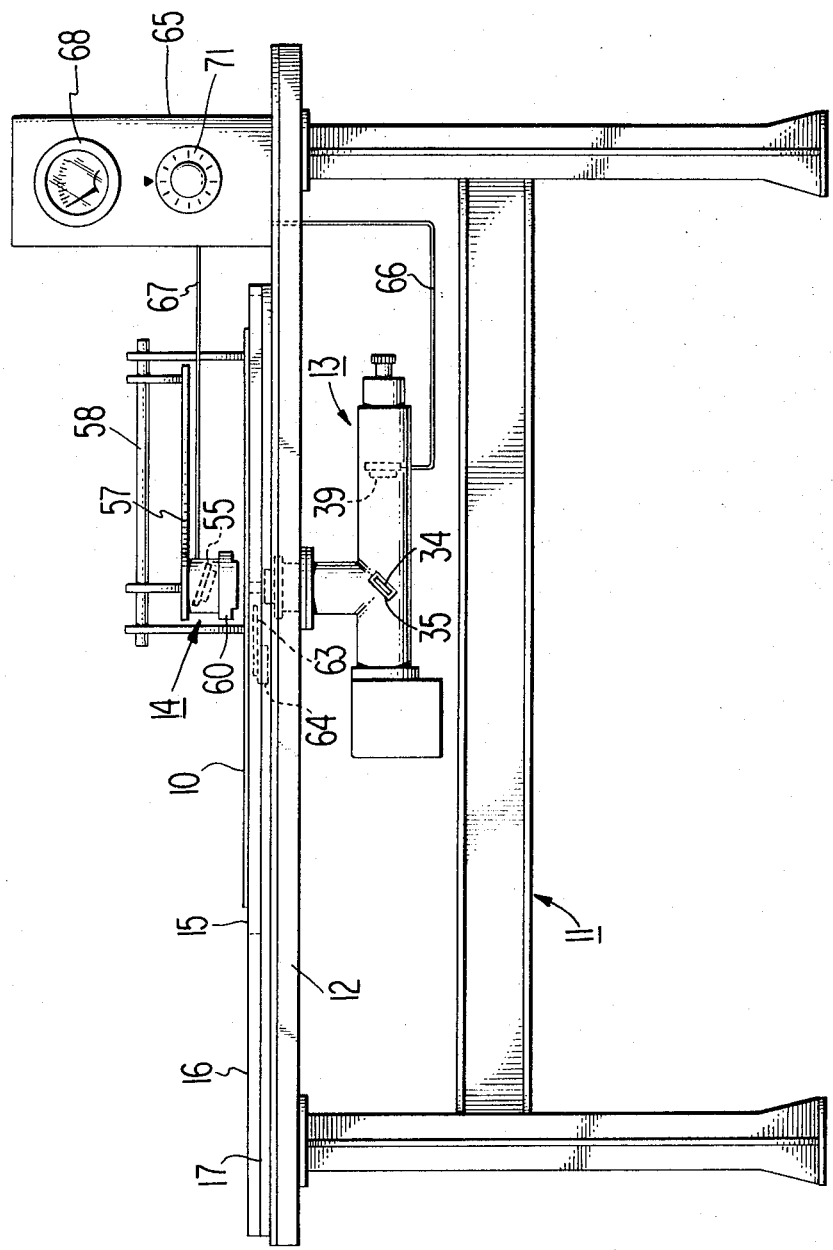
FIG. 2 is a front elevational view partially schematic of the apparatus of FIG. 1.

FIGS. 1 and 2 illustrate an aperture mask 10 for a color television picture tube positioned on a light-transmission-measuring apparatus known in the art as a "densitometer." The densitometer 11 is designed to measure the light transmission of selected portions of a semitransparent membrane such as an aperture mask 10.

The densitometer 11 is comprised of a table 12, a light transmission and reference unit 13 mounted below the table 12, and a light-measuring unit 14 mounted over the table 12.

The apparatus includes a means for holding the aperture mask 10 comprising a turntable 15 positioned on a carriage 16 adjustably traversable on horizontal tracks 17 on the top surface of the table 12. The carriage 16 traverses on a first set of vertical rollers 18 and is guided by a first set of horizontal rollers 19, and the turntable 15 rotates on a second set of vertical rollers 20 and is guided by a second set of horizontal rollers 21. A first index pin 22 fixes the angular position of the turntable 15 with respect to a first series of matching index holes 23 on the periphery of the turntable 15 and a second index pin 24 on the carriage 16 fixes the radial position of the turntable 15 with a second series of matching index holes 25 on the top of the table 12. The turntable 15 includes mask-locating pins 26a, 26b, and 26c radially adjustable in slots to permit the apparatus to accommodate different size aperture masks and a center hole 27 and eight radial slots 28a through 28h vertically through the turntable 15 to provide clearance for passing the measuring beam 29.

The light transmission and reference unit 13 and the light-measuring unit 14 are illustrated in more detail in FIG. 3. The apparatus includes a means for producing a light beam 30 comprised of a lamp 31, such as a 200-watt projection lamp catalog No. CET marketed by General Electric Corp., Cleveland, Ohio, positioned at one end of a horizontal enclosure 32 and a reflector 33 behind the lamp 31 to refocus the light projected rearward forward onto the lamp 31 thereby increasing the forward efficiency of the light beam 30 from the lamp 31.

A beam-splitting means comprising a semisilvered plane mirror 34 having approximately 12 percent light transmission such as made by evaporating a coating of chromium on the surface of a flat plate of glass, is positioned in a mirror mounting 35 at a 45° angle in the horizontal enclosure 32, as shown in FIG. 3, in the path of the light beam 30 from the lamp 31. The mirror 34 splits the light beam 30 into a reflected measuring beam 29 and a transmitted reference beam 36. Two condensing lens 37a and 37b in a lens mounting 38 are positioned in the horizontal enclosure 32 between the lamp 31 and the mirror 34 to pass a virtually parallel light beam to the mirror 34.

A reference photocell 39 such as a Weston photocell catalog No. 856RR marketed by Weston Electric Instrument Co., Newark, N.J., is positioned in the path of the reference beam 36 at the opposite end of the horizontal enclosure 32. The reference photocell 39 is attached to a reference photocell mounting assembly 40 connected to one end of a shaft assembly 41. The shaft assembly 41 is adjustably mounted in a slidable casing 42 and an adjustment knob 43 is attached to the other end of the shaft assembly 41. The casing 42 is fixed in position in the horizontal enclosure 32 by a clamp screw 44. A fixed diffusing screen 45 is positioned in the horizontal enclosure 32 between the mirror 34 and the reference photocell 39, and an aperture plate 46 is positioned in front of the reference photocell 39.

A measuring-beam exit window 47 is positioned in a window mounting 48 at the top of a vertical enclosure 49 extending from the horizontal enclosure 32 in the path of the measuring beam 29. An aperture plate 50 is positioned over the exit window 47 to restrict the size of the measuring beam 29 passing through the mask 10. A means for producing a turbulent gas flow in front of the exit window 47 comprises an air housing 51 positioned around the exit window 47 having an axial opening 52 though the top for passing the measuring beam 29, a radial tube 53 opening in the side of the air housing 51, a flexible hose 54 connecting to a filter (not shown), and a suitable gas supply (not shown).

A measuring photocell 55 having a substantially flat window 56 is positioned on the light-measuring unit 14 in a measuring photocell housing 59 on a support arm 57. A preferred measuring photocell 55 is a Weston photocell catalog No. 856RR marketed by Weston Electric Instrument Co., Newark, N. J. The support arm 57 is pivotally mounted on the table 12 at the pivot pin 58. The measuring photocell 55 is attached to the measuring photocell housing 59 tilted to position the window 56 at a 12° angle with respect to the path of the measuring beam 29. A light baffle 60 having a bottom aperture 61 for admitting the measuring beam 29 is positioned over the measuring photocell 55 as shown in FIG. 3. The baffle 60 includes a light-absorbing coating 62 on the interior surface of the baffle 60.

A shutter 63 is positioned over the exit window 47 between the exit window 47 and the turntable 15. The shutter 63 is operated by a solenoid 64. The means for comparing a signal from the reference photocell 39 and a signal from the measuring photocell 55 comprises a circuit contained in a circuit box 65, wire 66 connecting the box 65 to the reference photocell 39, wire 67 connecting the box 65 to the measuring photocell 55, a meter 68 and a dial 71.

In the operation of the densitometer shown in FIGS. 1 and 2, an aperture mask 10 is positioned on the turntable 15 over the locating pins 26a, 26b and 26c. The first index pin 22 and the second index pin 24 are retracted by operation of a first or second foot switch (not shown) to rotate the turntable 15 and to traverse the carriage 16 to align a selected portion of the mask 10 and a clearance hole 27 or clearance slots 28a through 28h with the measuring-beam path.

In measuring the light transmission of the selected portion of the mask 10, a light beam from the lamp 31 is projected through the condensing lens 37a and 37b incident on the mirror 34. The mirror 34 splits the light beam, reflecting a measuring beam 29 and transmitting a reference beam 36. The reference beam 36 passes through the fixed screen 45 and the aperture plate 46 to fall on the reference photocell 39 producing a reference signal. The measuring beam 29 passes through the exit window 47, the aperture plate 50, the axial opening 52 in the air housing 51, a clearance hole 27 or clearance slot 28a through 28h in the turntable 15, the selected portion of the aperture mask 10, the aperture 61 in the light baffle 60 to fall on the measuring photocell 55. A measured signal produced by the measuring photocell 55 is compared to the reference signal produced by the reference photocell 39 in a circuit contained in a circuit box 65, producing an output signal on the dial 71 which is a function of the light transmission of the mask 10.

The dial 71 is adjusted to produce a null output signal on the meter 68. The dial 71 is appropriately calibrated to provide a reading which is a measure of mask aperture size. To calibrate the dial 71, a gauge with known aperture size is positioned on the unit. The reference photocell 39 is coarse adjusted by sliding the photocell casing 42 in the horizontal enclosure 32 until an approximate reading of the known aperture size is obtained on the dial 71 and maintained in this position by clamping screw 44. The knob 43 is then fine adjusted to provide the desired reading of the known aperture size on the dial 71. During the measurement cycle, the solenoid 64 is disengaged to retain the shutter 63 in the open position.

GENERAL CONSIDERATIONS

Other lamps may be used for producing a light beam in place of the lamp 31 previously described. It is preferable that the lamp be positioned supported in a vibration-free mounting at one end of the horizontal chamber 32 to project a light beam 30 on the mirror 34.

Although the preferred beam-splitting means is described as a semisilvered mirror 34 having an approximate 12 percent light transmission, a fullsilvered mirror having an aperture for passing the reference beam an also be used. Any beam-splitting means used must appropriately divide the light beam 30 into a measuring beam 29 and a reference beam 36.

The fixed diffusing screen 45 as previously described decollimates the reference beam 36 whereby the intensity of the reference beam 36 varies with the square of the distance from the screen 45. This permits controlling the intensity of the light on the reference photocell 39 by the spacing between the reference photocell 39 and the screen 45. An additional aperture plate 46 can be positioned as described in front of the reference photocell 39 to further decrease the intensity of the light so as to more nearly match the light intensity on the reference photocell 39 and the measuring photocell 55 thereby providing a larger range of spacing of the reference photocell 39 for a given light intensity.

In the preferred embodiment, air enters the air housing 51 through a radial tube 53 to create a turbulent flow over the exit window 47 and to exit through the axial opening 52. The airflow must enter the chamber radially to provide a turbulent flow over the exit window 47 to continuously prevent dust or dirt particles from collecting on the exit window 47. Tangential entry of the air is not satisfactory since the air creates a vortex in the air housing 51 causing dust and dirt particles to be pulled into the chamber.

It is preferred that the shutter 63 be positioned in the path of the measuring beam 29 between the exit window 47 and the turntable 15 since this prevents the measuring photocell 55 from receiving the full intensity of the measuring beam when no portion of a mask 10 is in position on the turntable 15. The recovery time for one type of photocell is a minimum of 15 minutes. The shutter can also be positioned in the path of the light beam 30 or in the path of the measuring beam between the exit window 47 and the mirror 34.

FIG. 4 illustrates schematically the reflection of the measuring beam 29 from the window 56 of the measuring photocell 55 mounted at a 12° angle. The measuring beam 29 falling on the photocell window 56 is divided into a transmitted beam 69 and a reflected beam 70a as shown schematically by the solid line in FIG. 4. If the measuring beam 29 were to fall upon the measuring photocell window 56 mounted normal to the path of the measuring beam 29, the reflected beam 70b as shown schematically by the dotted line in FIG. 4 would be reflected to the mask 20 and reflected to the measuring photocell 55 causing the light from the reflected beam to be added to the light passing through the mask 10. In another form of the apparatus a light baffle 60 including an interior light-absorbing coating 62 is positioned over the measuring photocell 55. By mounting the measuring photocell at a 12° angle, the reflected beam 70a is fully deflected to be substantially absorbed in the light-absorbing coating 62. Mounting the measuring photocell 55 at an angle between 5° and 25° adequately prevents the reflected beam 70 from re-reflecting into the measuring photocell 55. It is preferred that the angle be between 10° and 15° for optimum operation. When the angle is less than 5°, some portion of the reflected beam 70 may return to the measuring photocell, and when the angle is greater than 25°, the measuring photocell 55 may not receive a sufficient portion of the light from the measuring beam 29 reducing the photocell sensitivity and the accuracy of the measurement. The spacing between the bottom of the baffle 60 and the turntable 15 is selected to prevent entry of any ambient light to strike the measuring photocell 55.

I claim:

1. An apparatus for measuring light transmission of a semitransparent membrane, said apparatus including:
   1. means for producing a light beam,
   2. means for splitting said beam into a measuring beam and a reference beam,
   3. a reference photocell in the path of said reference beam for producing a reference signal,
   4. a measuring photocell in the path of said measuring beam for producing a measured signal, said measuring photocell including a housing and a substantially flat window, said window dividing said measuring beam into a reflected beam and a transmitted beam,
   5. means for holding said semitransparent membrane in the path of said measuring beam between said beam-splitting means and said measuring photocell,
   6. and means for comparing said reference signal with said measured signal for producing an output signal, wherein the improvement comprises:
said measuring photocell mounted with said window at an angle with respect to the path of said measuring beam to deflect said reflected beam away from the path of said measuring beam sufficiently to reduce the further reflection of the reflected beam back from said membrane.

2. The apparatus of claim 1 wherein said angle is in the range of 5° to 25°.

3. The apparatus of claim 1 wherein said angle is in the range of 10° to 15°.

4. The apparatus of claim 1 wherein said membrane is an aperture mask used in a color television picture tube.

5. The apparatus of claim 1 including a light shutter in the path of said measuring beam.

6. The apparatus of claim 5 wherein said light shutter is between said beam-splitting means and said holding means.

7. The apparatus of claim 1 wherein the elements (1), (2), and (3) are contained in a dust-free enclosure, said enclosure including an exit light transmission element positioned between said means for holding said membrane and said beam-splitting means.

8. The apparatus of claim 7 wherein said light transmission element is horizontally positioned and including means for producing a turbulent flow of a clean gas in front of the exterior surface of said light-transmission element.

* * * * *